United States Patent
Iannaccone et al.

(10) Patent No.: US 7,742,414 B1
(45) Date of Patent: Jun. 22, 2010

(54) LIGHTWEIGHT INDEXING FOR FAST RETRIEVAL OF DATA FROM A FLOW-LEVEL COMPRESSED PACKET TRACE

(75) Inventors: Gianluca Iannaccone, Cambridge (GB); Tao Ye, Burlingame, CA (US)

(73) Assignee: Sprint Communications Company L.P., Overland Park, KS (US)

(*) Notice: Subject to any disclaimer, the term of this patent is extended or adjusted under 35 U.S.C. 154(b) by 1027 days.

(21) Appl. No.: 11/428,153

(22) Filed: Jun. 30, 2006

(51) Int. Cl.
H04L 12/26 (2006.01)
H04L 12/28 (2006.01)

(52) U.S. Cl. .................. 370/231; 370/253; 370/394
(58) Field of Classification Search .................. None
See application file for complete search history.

(56) References Cited

OTHER PUBLICATIONS

Iannaccone, Gianluca, et al., "Monitoring Very High Speed Links".

Primary Examiner—Melanie Jagannathan

(57) ABSTRACT

The present invention describes methods, systems, and data structures to create and search index records within a trace of a packet-based communications link that has been compressed by organizing the data packets according to which flow they belong. Index points are inserted within the compressed flow trace file to create frames and index records are created and saved for each index point. Consequently, searching for a particular data packet does not require sequentially reading the compressed flow trace file, but rather locating the appropriate index record and its corresponding frame in the compressed flow trace file.

22 Claims, 8 Drawing Sheets

ORIGINAL ORDER OF PACKETS

ORDER OF PACKETS IN COMPRESSED FLOW
TRACE FILE

LIGHTWEIGHT INDEXING FOR FAST RETRIEVAL OF DATA FROM A FLOW-LEVEL COMPRESSED PACKET TRACE

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to indexing trace records collected from monitoring packet-based communication links. More particularly, the present invention relates to indexing trace records of packet-based protocols that are compressed by organizing the packet records according to which flow they belong.

BACKGROUND OF THE INVENTION

Network monitoring is commonly used to measure traffic data across links connected to a particular router within a packet-based network. The traffic data can be useful for analyzing protocols, traffic engineering, and network anomaly detection. An interface within the router operates at a link speed indicating how much information can traverse the interface in a specified timeframe. For example, an OC-48 link can transfer data at a rate of up to 2,488 megabits per second. Passive monitoring involves copying data packets off a link in a manner that does not substantially affect the performance of the link. A data packet contains information regarding its source, its destination, its protocol type, its size, and its payload. This information, along with the time when the data packet crossed the link, can be helpful in reconstructing flows of related packets with the same sources and destinations. The packet information captured during the monitoring activity is commonly referred to as a trace.

Passive monitoring involves tapping the link on which data needs to be collected and recording to disk either complete packets or partial packets, such as packet headers and timestamps indicating their arrival time. In the case of fiber-based networks, an optical splitter may split the optical signal, therefore effectively copying all of the data on the link, which may be received by a packet capture card on a personal computer (PC). Timestamps recorded by the capture card may be synchronized to a global positioning system (GPS) signal. Packets are temporarily stored on the capture board and then sent to the PC main memory over the PC's PCI bus.

Collecting packet traces at higher than OC-48 link speeds can be difficult for several reasons:
- PCI bus throughput is already challenged at OC-48. During passive monitoring, the PCI bus is crossed twice for any data transfer: once from the capture board to the main memory, and a second time from the main memory to the hard disk.
- Collecting data at OC-48 results in possibly terabytes of trace information per day in a point of presence (POP). At OC-192, the storage capacity must increase by a factor of four, and the challenge of managing such an enormous data set increases greatly as well.
- Memory access speeds have not increased as quickly as the link speed.
- Disk array speed has not kept up with link bandwidth. At OC-192 speed, a packet-level trace would require a disk bandwidth of roughly 250 megabytes per second.

A passive monitoring infrastructure suitable for deployment for OC-192 links will benefit if it can perform some computation on-line so as to minimize the amount of data stored locally. But the computation must be simple—at OC-192 (10 Gbps) a new packet arrives every 240 ns on average (assuming 300-byte packets). This allows only 360 instructions per packet on the fastest processor currently available. Such a monitoring system may store the minimum amount of information necessary to simplify collection and storage. Sampling, such as copying every tenth packet rather than every packet, may be required in addition to compression.

One way to achieve these requirements is to store internet protocol (IP) packet data as flow traces instead of packet traces. A flow trace groups packets together that are from the same source and addressed to the same destination during a short time period. By collecting the related packets together, information that is common to all of the packets within a flow can be stored once for each flow, rather than with each packet. Since the common information can be removed from each data packet within the same flow, the resulting flow trace is compressed. With a compressed flow trace, less information is stored and processed, which reduces the resources required to collect data across higher speed links. Unfortunately, because the packets are no longer in chronological order, reconstructing the original arrival order of the packets from a flow-based trace requires sequentially reading the compressed flow trace file until the target packet is located.

BRIEF SUMMARY OF THE INVENTION

The present invention provides methods, systems, and data structures to index records within a trace record of a packet-based communications link that has been compressed by organizing the data packets according to which flow they belong. Methods for searching trace records using an index are also provided. A method of indexing the compressed flow trace file in accordance with the present invention creates frames by logically dividing the compressed flow trace file at index points and creating an index record in an index file for each index point. A method of both compressing and indexing a trace of a packet-based communication link in accordance with the present invention may comprise monitoring data packets on a communications link, identifying to which flow a data packet belongs, saving part of the data packet in a flow record, creating frames by logically dividing the compressed flow trace file at index points and creating an index record in an index file for each index point. The contents of an index record may comprise the offset from the beginning of the trace record, the number of packets within the frame summarized by the index record, a minimum time stamp in the frame and a maximum time stamp in the frame.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

In the present invention, the packet trace data may be stored in flow records, followed by records for each packet that belongs to the flow. A flow may be identified using the classical 5-tuple definition of source address, destination address, source port, destination port and protocol type. Packets containing common data in these fields are considered to belong to the same flow.

The data that is common to all packets in a flow may be stored in a flow record. Flow record information may include the source address, destination address, source port, destination port, protocol type and flow starting time. The data that is specific to a particular packet in a flow is stored in a packet record. Data packet information may include packet arrival time, packet size, IP identifier, type of service, time to live, sequence number, and TCP flags.

To facilitate searching flow records, index records may be created. These index records may be created concurrently with the creation of the flow records or may be created from stored flow records at a later time.

Figure 1:
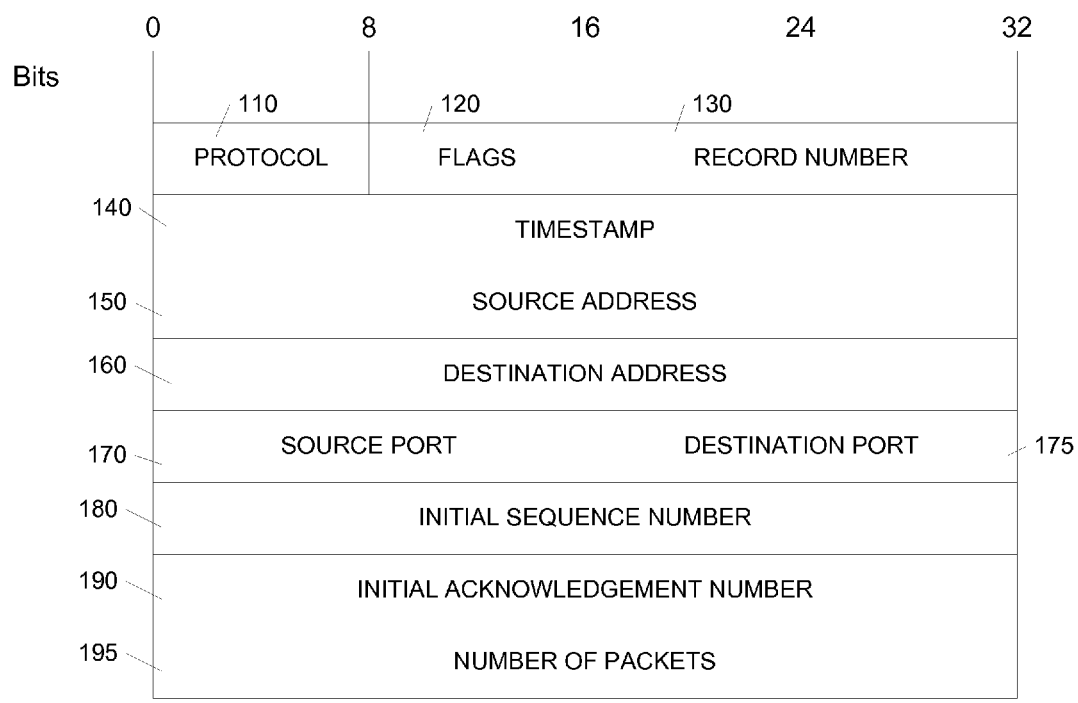
FIG. 1 illustrates the components of a flow record in accordance with the present invention.

Referring to FIG. 1, a flow record 100 is illustrated in accordance with the present invention. Flow record 100 may contain a timestamp 140 identifying when this flow started. Timestamp 140 may be a 32-bit field. Timestamp 140 may be in seconds and may be used as a base reference for the timestamp in each packet record within the flow. Also stored in the flow record 100 may be the protocol number 110, which may comprise an 8-bit field. Another 8-bit field may contain flags 120, such as the Last Record (LR) flag used to specify if the current record is the last record for a given flow. The record number 130 may be recorded as a 16-bit field to enumerate the number of records that constitute a single flow. The source IP address 150 and destination IP address 160 may each be stored as 32-bit fields. Optionally, depending on the protocol, the source port number 170 and destination port number 175 may each be stored as 16-bit fields. The initial sequence number 180 and initial acknowledgement number 190 may be stored as 32-bit fields, if required by the protocol, such as Transport Control Protocol (TCP). The number of packets 195 may be stored as a 32-bit field. Another option is to store the number of packets 195 as a 5-bit field packed along with flags 120 to fill an 8-bit field.

Figure 2:
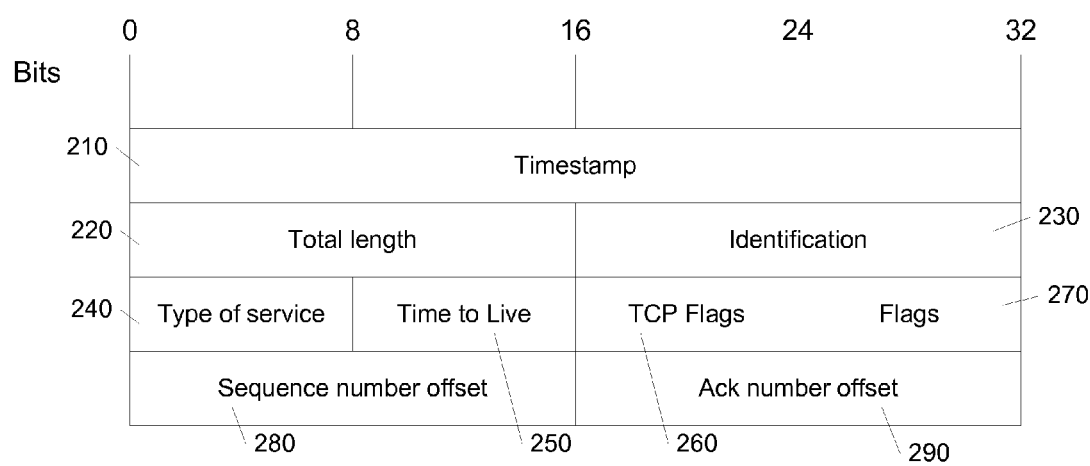
FIG. 2 illustrates the components of a packet record in accordance with the present invention.

Referring to FIG. 2, a packet record 200 is illustrated in accordance with the present invention. Packet record 200 may contain a timestamp 210. Timestamp 210 may comprise the time offset of the packet from the flow start time stored as a 32-bit field. Optionally, timestamp 210 may be an offset from the previous packet stored as a 24-bit field. The packet length in bytes 220 and packet identification 230 may each be stored as 16-bit fields. The type of service 240 and time to live 250 may each be stored as 8-bit fields. The TCP flags 260 may be stored as an 8-bit field. Another 8-bit field may contain packet record flags 270, such as the Last Packet (LP) flag that is used to identify the last packet belonging to a given flow. Depending upon the protocol, the sequence number 280 offset from the previous packet or the initial sequence number of the flow may optionally be stored as a 16-bit field. The acknowledgement sequence number 290 offset from the previous packet or the initial acknowledgement number of the flow may be stored as a 16-bit field, if required by the protocol.

While compressing the packet data in the manner described above as flow record 100 and packet record 200 requires less space and computing resources, decoding the compressed flow trace file that results to restore the original packet records in the order of arrival is a resource and time intensive process. The packets may be essentially randomly ordered in the compressed flow trace file. To reconstruct the original packet order the entire compressed flow trace file must be read. A further aspect of the present invention is to index the compressed flow trace file in a manner that lessens the resources and time required to restore the original packet records in the order of arrival. By creating index records periodically, the packet order may be reconstructed without reading the entire compressed flow trace file sequentially.

Figure 3:
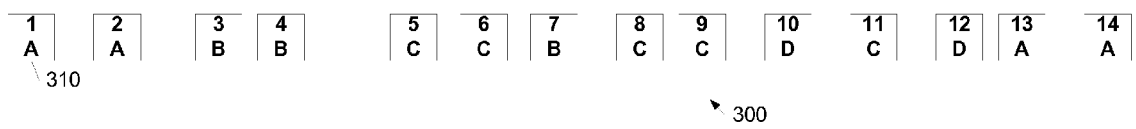
FIG. 3 illustrates the original order of the data packets and the order of the data packets within the compressed flow trace file in accordance with the present invention.
Figure 3:
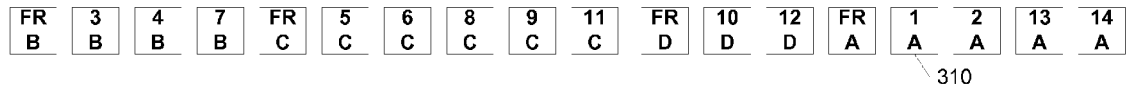

Referring to FIG. 3, an example of an original packet arrival order 300 and a resulting order in the compressed flow trace file are illustrated in accordance with the present invention. The original packet arrival order 300 is in numerical order beginning with data packet 310. The numbers on the data packets illustrated in arrival order 300 reflect the arrival timestamp of the data packet from earliest to latest in the present example. The packets may arrive erratically in time, with some packets arriving close together and with others arriving more widely spaced in time. The alphabet letter on the data packet indicates to which flow it belongs, for example, data packet 310 belongs to flow A. Within the compressed flow trace file 350, the data packets are not in numerical order, but rather are arranged according to flow. Each flow is preceded by a flow record labeled 'FR'. Locating a particular packet, such as data packet 310 requires sequentially reading nearly every data packet record in the file. In actual practice, many more packets and flows would arrive across a monitored link and be stored to a compressed flow trace file. The present example has been simplified to fourteen packets and four flows for ease of presentation.

Figure 4:
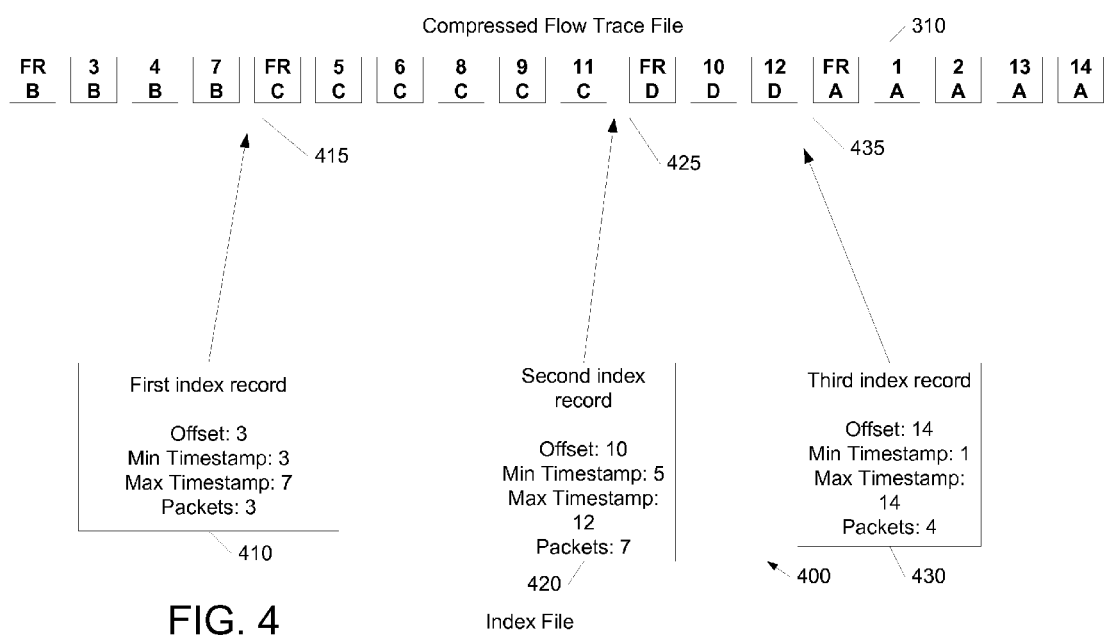
FIG. 4 illustrates the index points within the compressed flow trace file in accordance with the present invention.

Referring to FIG. 4, index file contents 400 are illustrated in accordance with the present invention. First index record 410 summarizes the packet records between the beginning of the compressed flow trace file and the index point 415. In this scenario, the compressed flow trace file is logically divided between flows, creating an index record at index point 415 after the flow is terminated and before the next flow record. Other methods to determine the location of index records, or index points, are possible.

Index record 410 contains an offset from the beginning of the compressed flow trace file equal to 3, indicating that index record 410 was created for index point 415 after the third data packet. The data packets that are referenced by index record 410 may be referred to as a frame. The offset may also be recorded as the number of bytes since the beginning of the compressed flow trace file. A minimum timestamp of 3 indicates that the minimum timestamp associated with packets in the frame is 3. A maximum timestamp of 7 indicates that the maximum timestamp associated with packets in the frame is 7. A number of packets of 3 indicates that there are three data packets in the frame.

Continuing to second index record 420, index point 425 in the present example is between the tenth and eleventh data packets. Index record 420 contains an offset from the beginning of the compressed flow trace file equal to 10, indicating that index record 420 was created after the tenth data packet. The offset in any index may also be recorded as the number of bytes since the beginning of the compressed flow trace file. A minimum timestamp of 5 indicates that the minimum timestamp associated with packets in the frame is 5. A maximum timestamp of 12 indicates that the maximum timestamp associated with packets in the frame is 12. A number of packets of 7 indicates that there are seven data packets in the frame.

Continuing to third index record 430, index point 435 is depicted after the fourteenth data packet. Index record 430 contains an offset from the beginning of the compressed flow trace file equal to 14, indicating that index record 430 was created after the fourteenth data packet. The offset may also be recorded as the number of bytes since the beginning of the compressed flow trace file. A minimum timestamp of 1 indicates that the minimum timestamp associated with packets in the frame is 1. A maximum timestamp of 14 indicates that the maximum timestamp associated with packets in the frame is 14. A number of packets of 4 indicates that there are four data packets in the frame. In actual practice, many more packets and flows would arrive across a monitored link and be stored to a compressed flow trace file. Consequently many more index records would be required. The present example has been simplified to three index records with fourteen packets and four flows for ease of presentation.

To search for a particular data packet, such as data packet 310, a search of index records may be performed to look for an index record with a minimum time stamp less than or equal to the timestamp of data packet 310 and a maximum time stamp greater than or equal to the timestamp of data packet 310, which is in this example is equal to one. The only index record that would satisfy these requirements in this example is index record 430, thus limiting the number of packets to be searched to the four packets within the frame of index record 430.

Index points 415, 425, and 435 could be determined by a number of methods. One method would be to create index records after a predetermined number of data packets, for example, every ten data packets. Another method would be to create index records at a predetermined time interval, for example, every 10 milliseconds. Other methods may include creating index records between flow records within the compressed flow trace file or after a predetermined number of flow records within the compressed flow trace file. One skilled in the art will appreciate that any method of placing index points may be used without departing from the scope of the present invention.

Figure 5:
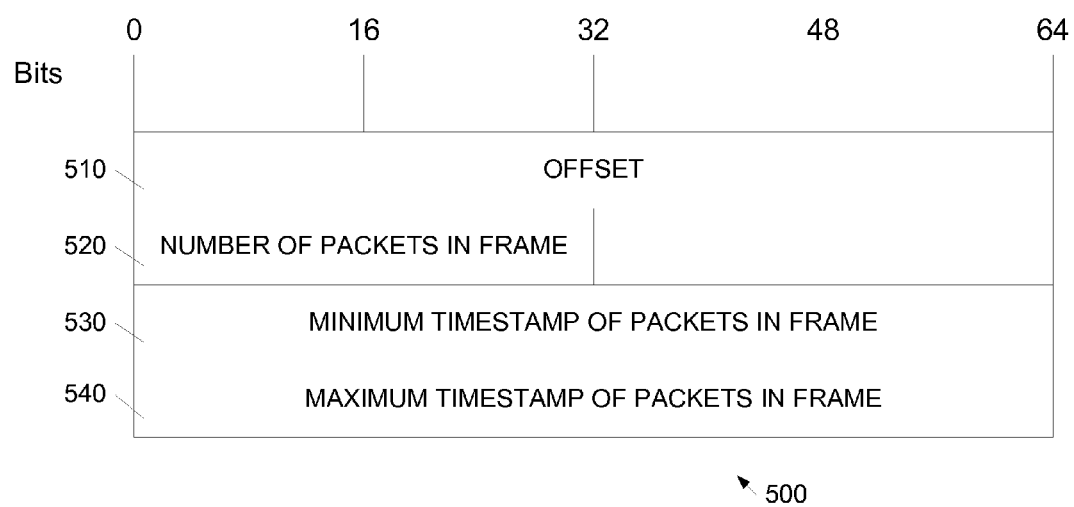
FIG. 5 illustrates the components of an index record in accordance with the present invention.

Referring to FIG. 5, an index record 500 is illustrated in accordance with the present invention. Index record 500 may contain an offset 510, which is an offset from the beginning of the compressed trace record file and may be stored as a 64-bit field. The offset may be stored as the number of packets or the number of bytes from the beginning of the compressed trace record file. The number of data packets 520 in the frame referred to by index record 500 may be stored as a 32-bit field. The minimum timestamp 530 present in the frame may be stored as a 64-bit field. The maximum timestamp 540 present in the frame may be stored as a 64-bit field.

Index records may be created as the compressed flow trace file is created. Alternatively, index records may be created at a later time from a stored compressed flow trace file. In the scenario where an index record is created as the compressed flow trace file is created, additional fields in the index record may be useful. Because the process of creating the compressed flow trace file results in some records being held in memory and written later, after the flow terminates, the number of packets seen by the process may be different than the number of packets written to the compressed flow trace file. Thus, the number of packets seen and the number of packets written may be stored as separate 64-bit fields. In this scenario, it may also be useful to record the timestamp last seen as a 64-bit field.

Figure 6:
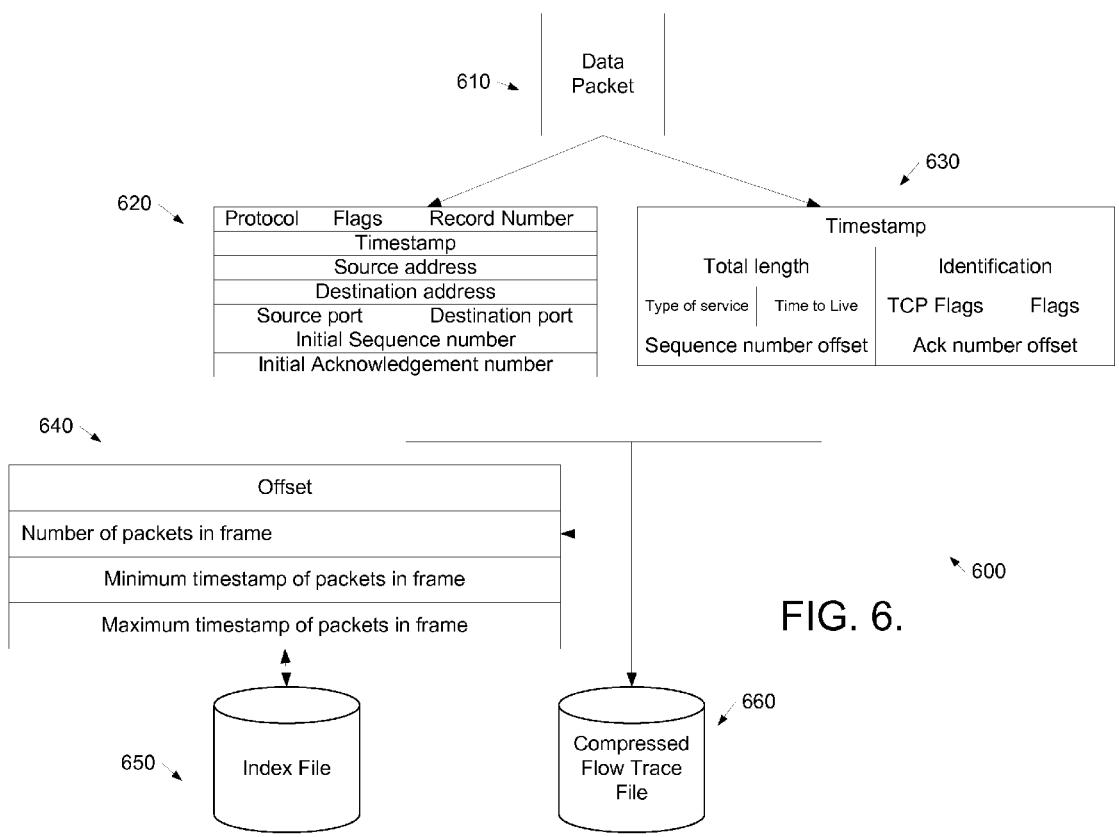
FIG. 6 illustrates a method for creating index records within a compressed trace file in accordance with the present invention.

Referring to FIG. 6, a method 600 of creating index records in a compressed flow trace file is illustrated in accordance with the present invention. Data packet 610 is classified to flow A represented by flow record 620. A packet record 630 is created. Flow record 630 may already exist if this is not the first data packet within the flow. In the case where flow record 630 does not exist, it is created. When flow A of flow record 630 terminates, i.e. a data packet from that flow has not been detected for a predetermined length of time, flow record 630 is stored to compressed flow trace file 660. If a new index record is needed, index record 640 is created. The minimal timestamp field of index record 640 is set to the current packet's timestamp and updated by each saved flow as new packets belonging to flow A arrive. Index record 640 is stored to an index file 650 when the frame is full. In this method, index record 640 is created as flow record 620 is terminated and stored to compressed flow trace file 660.

Figure 7:
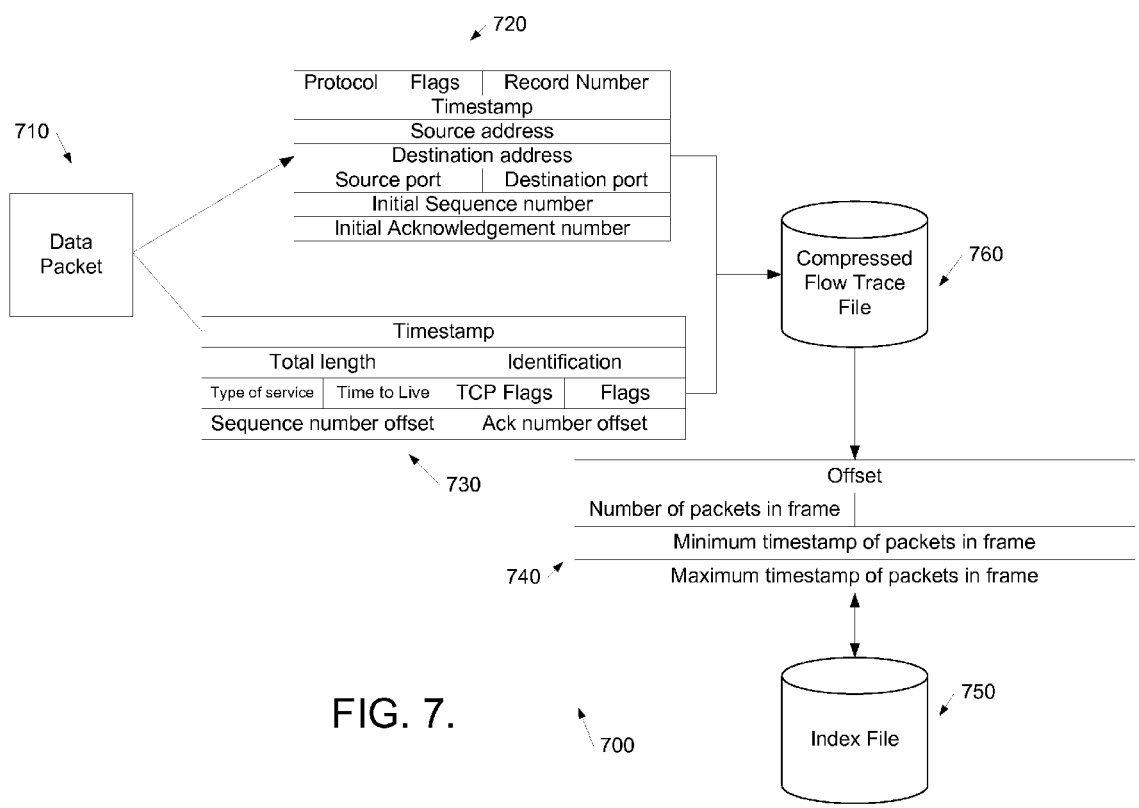
FIG. 7 illustrates a further method for creating index records within a compressed trace file in accordance with the present invention.

Now referring to FIG. 7, a further method 700 of creating index records for a compressed flow trace file is illustrated in accordance with the present invention. Data packet 710 is classified to flow A represented by flow record 720. A packet record 730 is created. Flow record 720 may already exist if this is not the first data packet within the flow. In the case where flow record 720 does not exist, it is created. Compressed flow trace file is completed in the same manner of creating flow records and packet records until the trace file is completely processed. Subsequently after storing flow record 720 and packet record 730 in compressed trace file 660, compressed flow trace file 660 is read sequentially and index record 740 is created and stored to index file 750. In this method, index record 740 is created some time after data packet 710 is processed and stored to compressed flow trace file 760.

Figure 8:
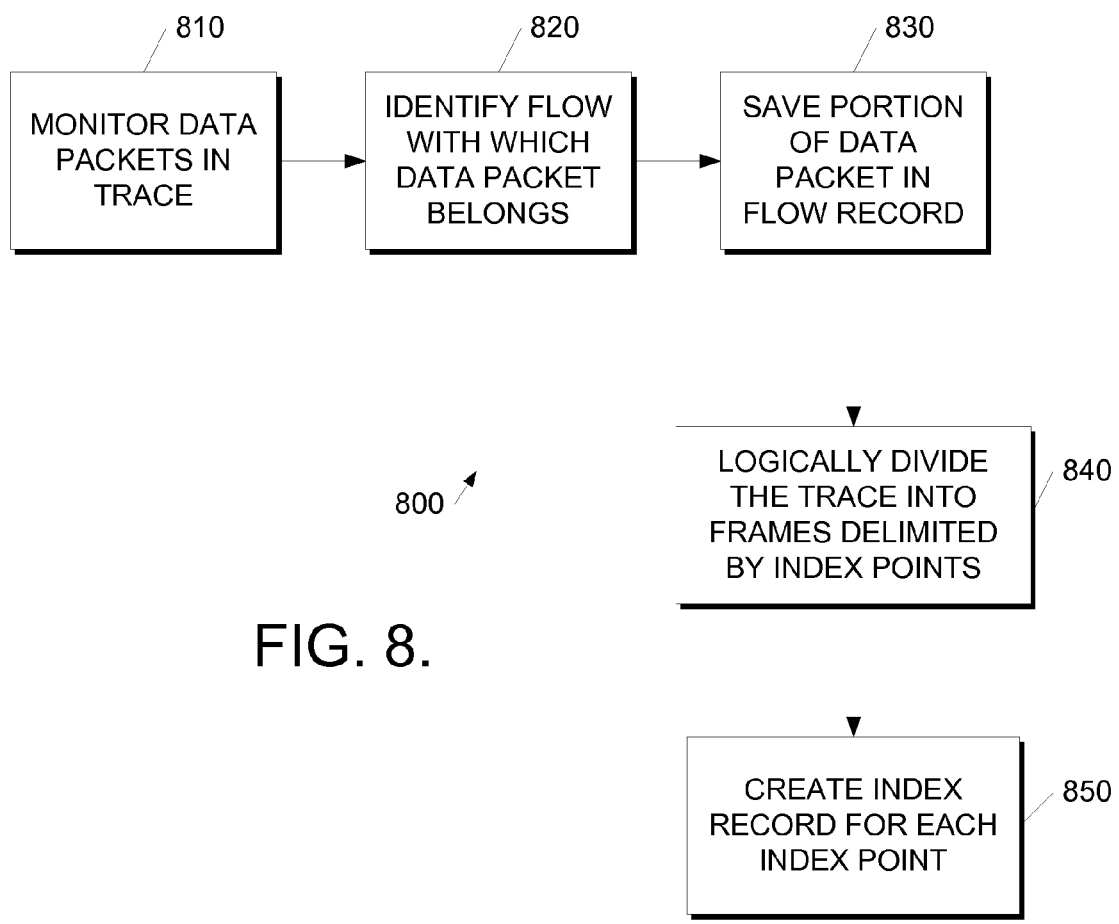
FIG. 8 illustrates a method of compressing and creating index records for a packet-based trace in accordance with the present invention.

Referring to FIG. 8, a method 800 of compressing and creating index records for a packet-based trace is illustrated in accordance with the present invention. In step 810 the data packets are monitored on a packet-based communications link. In step 820 the data packet is classified as to which flow the data packet belongs. If this is the first data packet for a flow, flow record is created and saved in step 830. Packet record may also be created and saved as well.

In step 840 frames are created within a compressed flow trace file by determining the location a new index record is required. The location of a new index record is referred to as an index point. As described earlier, a frame consists of the data packets between the beginning of compressed flow trace file and the first index point or the data packets between two successive index points. At each index point, an index record is created in step 850.

Index records may be created after a predetermined number of data packets, for example, every 10 data packets, or after a predetermined amount of time since the last index point, for example, every 10 milliseconds. Alternately, index records may be created between each flow record or after a predetermined number of flow records, for example, after every 10 flow records. One skilled in the art will appreciate that index records may be created using any technique without departing from the scope of the present invention.

Other index point insertion schemes may include schemes that vary according to traffic levels. For example, creating an index record every 10 milliseconds, but never allowing more than a specified number of packets in a frame. Conversely, an index record could be created every 10 milliseconds, unless a minimum number of packets in a frame is not satisfied. Any index point insertion scheme that creates frames of either fixed or varying time durations, or of either fixed or varying numbers of packets, or a combination of these two could be assumed by the present invention. Also, the present invention is applicable to a number of network protocols such as IP, asynchronous transfer mode (ATM), or other packet-based protocol.

What is claimed is:

1. A computer readable medium having stored thereon a data structure to describe the contents of frames of a compressed trace record file, the data structure comprising:
   an offset field containing data stored on the computer readable medium the data representing the offset of a first frame of the compressed trace record file from the beginning of the compressed trace record file;
   a number of packets field containing data stored on the computer readable medium representing the number of data packets recorded in a first frame of the compressed trace record file;
   a minimum time stamp field containing data stored on the computer readable medium representing the minimum time stamp of the data packets recorded in a first frame of the compressed trace record file; and
   a maximum time stamp field containing data stored on the computer readable medium representing the maximum time stamp of the data packets recorded in a first frame of the compressed trace record file.

2. The computer readable medium having stored thereon a data structure of claim 1, further comprising:
   an offset field corresponding to each frame of the compressed trace record file, each offset field containing data representing the offset of the corresponding frame of the compressed trace record file;
   a number of packets field corresponding to each frame of the compressed trace record file, each number of packets field containing data representing the number of packets recorded in the corresponding frame of the compressed trace record file;
   a minimum time stamp field corresponding to each frame of the compressed trace record file, each minimum time stamp field containing data representing the minimum time stamp of the data packets recorded in the corresponding frame of the compressed trace record file; and
   a maximum time stamp field corresponding to each frame of the compressed trace record file, each maximum time stamp field containing data representing the maximum time stamp of the data packets recorded in the corresponding frame of the compressed trace record file.

3. The computer readable medium having stored thereon a data structure of claim 2, wherein:
   each offset field comprises sixty-four bits of data;
   each number of packets field comprises thirty-two bits of data;
   each minimum time stamp field comprises sixty-four bits of data; and
   each maximum time stamp field comprises sixty-four bits of data.

4. A method for indexing a compressed trace record file; the method comprising:
   creating frames in the compressed trace record file stored on a computer by logically dividing the compressed trace record file into frames, delimited by logical index points, a frame being flow records and data packet records between the beginning of the compressed trace record file and the first index point and the flow records and data packet records between an index point and the next index point; and
   creating an index record for each index point, each index record comprising:
   an offset field containing data stored on a computer readable medium representing the offset of the corresponding index point from the beginning of the compressed trace record file;
   a number of packets field containing data stored on the computer readable medium representing the number of packets in the frame ending with the corresponding index point;
   a minimum time stamp field containing data stored on the computer readable medium representing the minimum time stamp of a packet in the frame ending with the corresponding index point; and
   a maximum time stamp field containing data stored on the computer readable medium representing the maximum time stamp of a packet in the frame ending with the corresponding index point.

5. The method for indexing a compressed trace record file of claim 4, wherein creating frames in the compressed trace record file by logically dividing the compressed trace record file into frames comprises logically dividing the compressed trace record file at predetermined time intervals.

6. The method for indexing a compressed trace record file of claim 4, wherein creating frames in the compressed trace record file by logically dividing the compressed trace record file into frames comprises logically dividing the compressed trace record file after a predetermined number of data packets have been recorded in a frame.

7. The method for indexing a compressed trace record file of claim 4, wherein creating frames in the compressed trace record file by logically dividing the compressed trace record file into frames comprises:
   compressing the trace record file by recording data packets based upon the flow to which the data packet belongs; and
   logically dividing the trace record file between flow records of the trace record file.

8. The method for indexing a compressed trace record file of claim 4, wherein creating frames in the compressed trace record file by logically dividing the compressed trace record file into frames comprises:
   compressing the trace record file by recording data packets based upon the flow to which the data packet belongs; and
   logically dividing the trace record file after a predetermined number of flow records have been recorded.

9. A method for forming and indexing a trace record file, the method comprising:
   monitoring data packets received over a packet-based communications link;
   identifying a flow to which each data packet belongs;
   saving at least a portion of each data packet in a flow record, each flow record corresponding to a flow;
   creating frames in the trace record file stored on a computer by logically dividing the compressed trace record file into frames, delimited by index points, a frame being flow records and data packet records between the beginning of the trace record file and the first index point and the flow records and data packet records between an index point and the next index point; and creating an index record for each index point, each index record containing data describing the data packet records in the frame ending with the corresponding index point.

10. The method for forming and indexing a trace record file of claim 9, wherein saving at least a portion of each data packet in a flow record comprises:
saving at least a portion of each data packet in a packet record, a packet record comprising at least the time stamp of the corresponding data packet; and
saving portions of the data packets that are common to all data packets in the flow record such that the flow record is separate from the packet records.

11. The method for forming and indexing a trace record file of claim 9, wherein creating an index record for each index point comprises:
creating an offset field containing data representing the offset of the corresponding index point from the beginning of the trace record file;
creating a number of packets field containing data representing the number of packets in the frame ending with the corresponding index point;
creating a minimum time stamp field containing data representing the minimum time stamp of a packet in the frame ending with the corresponding index point; and
creating a maximum time stamp field containing data representing the maximum time stamp of a packet in the frame ending with the corresponding index point.

12. The method for forming and indexing a trace record file of claim 11, wherein creating frames by logically dividing the compressed trace record file into frames comprises logically dividing the compressed trace record file at predetermined time intervals.

13. The method for forming and indexing a trace record file of claim 11, wherein creating frames by logically dividing the compressed trace record file into frames comprises logically dividing the compressed trace record file after a predetermined number of data packets have been recorded in a frame.

14. The method for forming and indexing a trace record file of claim 11, wherein creating frames by logically dividing the compressed trace record file into frames comprises logically dividing the compressed trace record file between flow records of the trace record file.

15. The method for forming and indexing a trace record file of claim 11, wherein creating frames by logically dividing the compressed trace record file into frames comprises logically dividing the compressed trace record file after a predetermined number of flow records have been recorded.

16. A method for searching a compressed trace record file, the method comprising:
creating frames in the compressed trace record file stored on a computer by logically dividing the compressed trace record file into frames, delimited by index points, a frame being flow records and data packet records between the beginning of the trace record file and the first index point and the flow records and data packet records between an index point and the next index point;
creating an index record for each index point, each index record comprising:
an offset field containing data stored on a computer readable medium representing the offset of the corresponding index point from the beginning of the compressed trace record file;
a number of packets field containing data stored on the computer readable medium representing the number of packets in the frame ending with the corresponding index point;
a minimum time stamp field containing data stored on the computer readable medium representing the minimum time stamp of a packet in the frame ending with the corresponding index point; and
a maximum time stamp field containing data stored on the computer readable medium representing the maximum time stamp of a packet in the frame ending with the corresponding index point;
selecting a target data packet;
sequentially reading the created index records until the index record that contains the target data packet is identified;
locating the frame in the compressed trace file stored on the computer described by the offset in the identified index record; and
sequentially reading the data packet records in the frame until the target data packet is located or the number of packets in the frame is read.

17. The method of searching a compressed trace file of claim 16 wherein selecting a target data packet comprises selecting a target data packet with an associated time stamp.

18. The method of searching a compressed trace file of claim 17 wherein sequentially reading the created index records until the index record that contains the target data packet is identified comprises sequentially reading the created index records until the index record that contains a minimum time stamp that is less than or equal to the target time stamp and a maximum time stamp that is greater than or equal to the target time stamp is identified.

19. The method of searching a compressed trace file of claim 16 wherein selecting a target data packet comprises selecting a target data packet from a particular flow.

20. The method of searching a compressed trace file of claim 19 wherein sequentially reading the created index records until the index record that contains the target data packet is identified comprises sequentially reading the created index records until the index record that contains the target flow is identified.

21. The method of searching a compressed trace file of claim 16 where the offset field represents the number of packets between the beginning of the compressed trace file and the index point described by the index record.

22. The method of searching a compressed trace file of claim 16 where the offset field represents the number of bytes between the beginning of the compressed trace file and the index point described by the index record.

* * * * *